Sept. 22, 1931.  W. C. LATHERS  1,824,554
AUTOMATIC BRAKE FOR TRAILERS
Filed Aug. 1, 1930   2 Sheets-Sheet 2
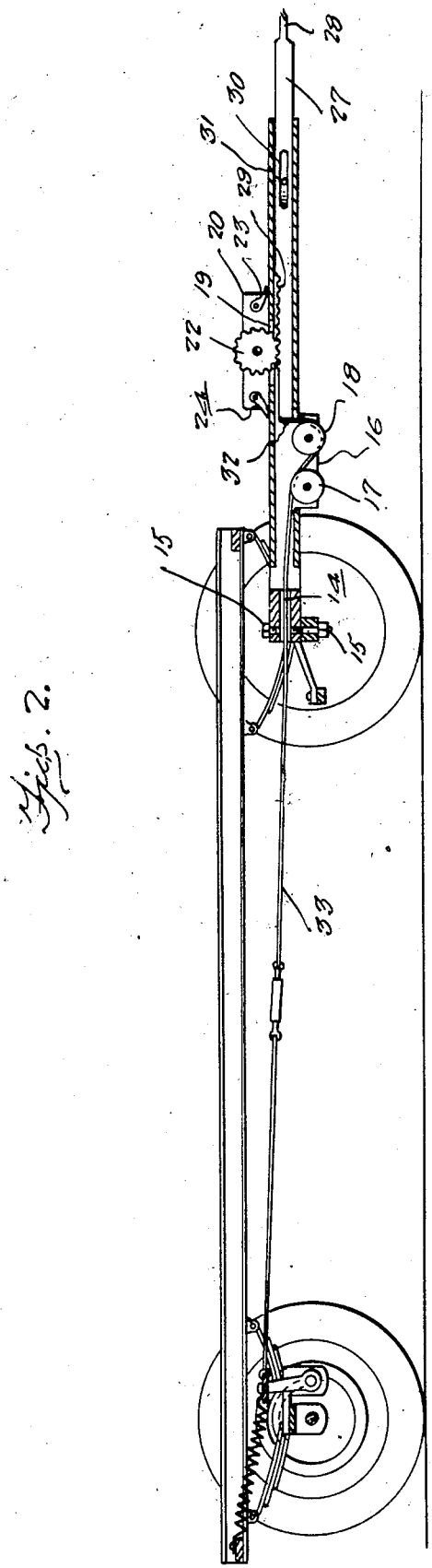
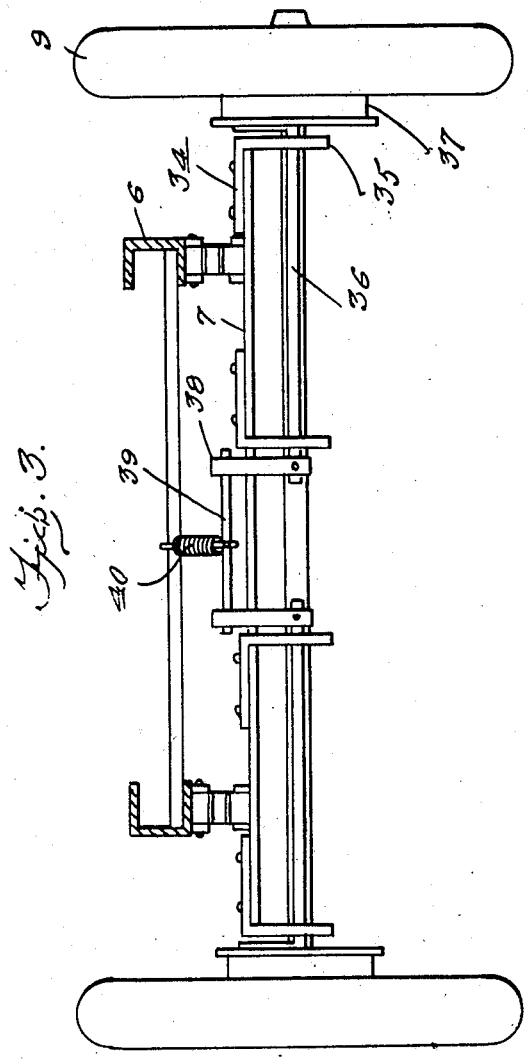
Inventor
W. C. Lathers
By Clarence A. O'Brien
Attorney Patented Sept. 22, 1931

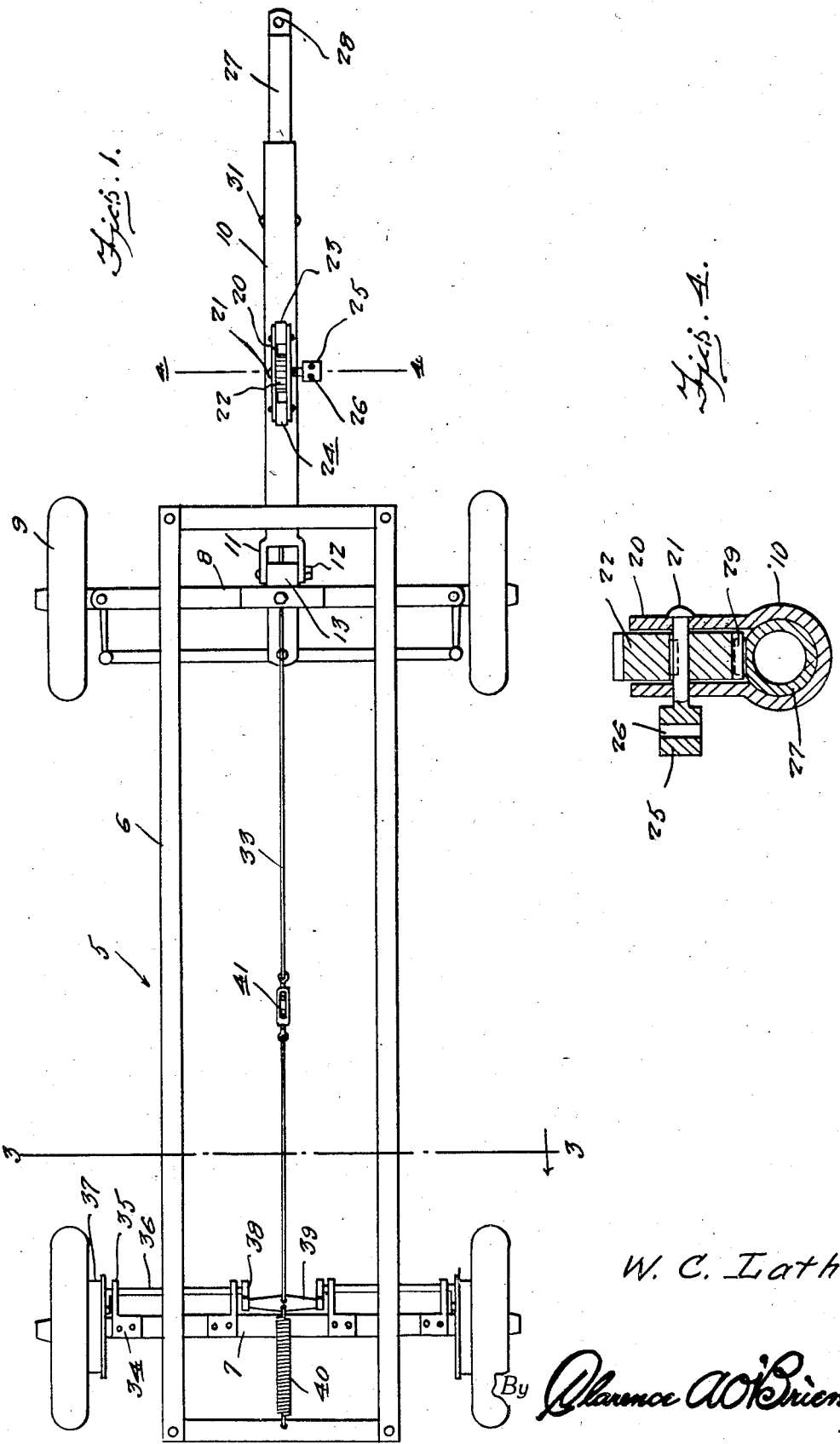

1,824,554

UNITED STATES PATENT OFFICE

WILLIAM CHARLES LATHERS, OF BELOIT, WISCONSIN

AUTOMATIC BRAKE FOR TRAILERS

Application filed August 1, 1930. Serial No. 472,340.

This invention relates generally to automatic brake systems for automotive trailers and particularly to the type of automatic brake of this kind which is automatically operable through its connection with the towing unit.

It is the object of this invention to provide an automatic brake of this type, which is adaptable to all types of trailers including trailers having four or more wheels and those having but a single pair of wheels, and also to the type which have a fifth wheel at one end for direct mounting upon the rear portion of a towing unit.

It is also an object of the invention to provide an automatic brake of the kind described, which does not require a control connection with the brake of the towing unit.

It is also an object of the invention to provide an automatic brake which may be installed for operation upon a series of trailers arranged in a train, without requiring a control connection either between any of said trailers or between the towing unit and said train of trailers.

It is also an object of the invention to provide an automatic brake of the type described which may comprise either two or four or more wheel brakes and which may use any type of such brakes.

It is also an object of the invention to provide an automatic brake of this type, which is simple and positive in operation and very simple and rugged in construction.

It is also an object of the invention to provide an automatic brake of this type which is highly efficient and which is simple and inexpensive to manufacture and install.

These objects, and other and further objects, the nature of the invention, its composition, and arrangement and combination of parts, will be readily understood from a reading of the following description of the drawings, in which:

Figure 1 is a front view of one embodiment of my invention showing a trailer equipped with my improved automatic brake system.

Figure 2 is a side elevation of Figure 1 of longitudinal section approximately centrally thereof.

Figure 3 is a transverse cross sectional view of Figure 1 looking toward the left of the line 3—3 thereof.

Figure 4 is a detail cross sectional view on the line 4—4 of Figure 1.

It is to be understood that I do not limit the application of this invention to the particular embodiment set forth herein and any change or changes may be made consistent with the spirit and scope of the invention.

Referring in detail to the drawings, one embodiment of my invention comprises a trailer 5 consisting of a wagon frame 6 mounted on a fixed axle 7 and a turning axle 8 which are mounted on wheels 9. To the turning axle 8 is pivotally secured a telescoping draw bar 10. There is a U-shaped portion on one end of the draw bar 10 which is designated 11, and the side portions of the member 11 are secured by stud bolts 12 to the sides of a body 13.

The body 13 has a longitudinal passage 14 therethrough, and said body is secured by means of upper and lower stud bolts to the turning axle structure 8, said stud bolts being designated 15.

The drawbar 10 is constructed of a hollow tube having a slotted projection 16 in which are mounted pulleys 17 and 18, and another slot 19 provided in the upper side of the tube and a housing 20 is mounted to register with the slot 19.

Journalled across the housing 20 is a shaft 21 carrying a toothed wheel 22 within the housing, the lower portion of said toothed wheel projecting through the slot 19 and within the tubular draw bar 10. Pivoted within the end portions of the housing 20 are oppositely disposed dogs 23 and 24 for selectively engaging teeth in the cogwheel 22 to retain the same against rotation in either or both directions.

Mounted on one end of the shaft 21 is the enlarged portion 25 having transverse bores 26 therethrough for accommodating a turning lever or bar (not shown) for manually operating said wheel 22. Telescopically mounted to slide within the tubular drawbar 10 is a bar 27 having at its outer end a coupling means 28 and on its upper side near its opposite ends a toothed rack 29.

When in position, the toothed rack 29 engages the teeth of the wheel 22 and is adapted to impart motion to said wheel. A transverse slot 30 is formed through said bar 27 and a pin 31 is disposed in said slot and secured to the sides of the tubular drawbar 10 to limit the sliding motion of said bar 27.

To the inner end of the bar 27 is secured at 32 a cable 33 which is lead from the point 32 and downwardly and around the pulley 18 and then upwardly and over the pulley 17 through the end of the tubular drawbar 10, and through the bore 14 in the body 13. The cable 33 leads rearwardly.

Mounted on the rear axles are plates 34 having angular projections 35 through which are journalled brake operating shafts 36 for operating any well known type of brake generally designed at 37. The inner ends of the shafts 36 are provided with angular offset levers 38 whose outer end portions are engaged by an equalizing toggle 39.

The cable 33 is lead to and attached to a central portion of the toggle 39 and a spring 40 which may be adjustable for adjusting the tension thereof, is arranged secured to the frame and to the said toggle 39 for maintaining the brake mechanism normally in released position. The cable 33 is preferably provided with a turnbuckle 41 for adjusting the tension thereof.

Pressing the bar 27 into the tubular draw bar 10 as will occur when the towing unit is slowed down or stopped causes the cable 33 to be drawn over the pulley 17 and further around the pulley 18 thus exerting a pull upon the rear extending portion of the cable 33, which pull is transmitted to the levers 38 which then turns the brake operating shaft 36 to operate the brakes 37.

When the bar 27 is again extended out of the tubular draw bar 10, it is obvious the spring 40 will return the brake operating lever into brake-releasing position, and the brakes will be accordingly released. The rack 29 operating with the teeth of the wheel 22 provides a means whereby the bar 27 may be locked in brake releasing or brake applying position in the tubular draw bar 10 by means of the dogs 23 and 24, in case it is desired to put the trailer backward or to park the same on a hill, or for other purposes.

The enlarged extension 25 of the shaft 21 is provided and formed so that a bar or lever may be inserted in the bore thereof 26 for manually adjusting the brake in released or braking position, in time of emergency and at other times for other purposes.

It is obvious that a similar principle may be applied in furnishing brakes for all four or more wheels of a trailer or the like.

It is obvious that any type of mechanically operated brake or other types of brake may be associated with and operated upon the principle enunciated herein and that many variations and adaptations of the principle announced by this invention may obviously be employed without departing from the scope of the invention.

It is obvious that I have provided an improved means operating upon a novel principle for providing for a brake system for unpowered wagons, trailers, and members of a drawn train, which permits automatic application of said brakes to slow or stop said members in a co-ordinated manner as the towing unit is slowed or stopped, and to provide that the said function shall be performed without undue jar and strain upon any of said members or the towing unit, thus enabling the construction of means for automatically braking drawn vehicles in co-ordination with the braking of the towing unit, in a safe, efficient and admirable manner, not heretofore known or practiced in the art.

It will also be obvious that I have provided a device of this kind which is not merely admirably adapted for the purposes designed, but which is efficient and simple in operation, and which is simple and inexpensive to manufacture, and which is readily adaptable to different types of brakes, and to different types of motorless vehicles adapted to be towed.

I claim:

A trailer of the type described, comprising a frame, axles on said frame, and wheels mounted on said axles, brakes associated with said wheels, brake operating shafts associated with said brakes, and brackets mounted on said axles for supporting said brake operating shafts, and levers on one end of said brake operating shafts, said levers connected by equalizing means, and a spring attached to the frame of the trailer to said equalizing means for maintaining said brakes in inoperative position, and a brake operating cable affixed at one end to said equalizing means and its other end projecting forward of said trailer frame; a hollow tubular draw bar pivoted to one of said axles, a brake operating bar mounted to slide telescopically in said hollow tubular draw bar, coupling means at the outer end of said bar, and attaching means at the forward end of said cable, a toothed rack on the upper side of the inner end of said bar, and a slot transversely through said bar at its ends; a hollow projection on the lower side of said tubular draw bar and a pair of pulleys arranged in said hollow projection, a housing mounted on the upper side of said hollow tubular draw bar adapted to register with the slot in said upper side of said pivoted draw bar, a pinion mounted for rotation transversely in said housing and projecting through said slot into said housing, said pinion adapted to engage the said rack on the sliding bar, and dogs pivoted in the ends of said housing adapted to selectively engage the teeth of said pinion, to retain said bar against longitudinal movement, and a hub on the outer end of the pinion wheel shaft having bores adapted to receive means for manually turning said pinion.

In testimony whereof I affix my signature.

WILLIAM CHARLES LATHERS.